(12) United States Patent
Russell et al.

(10) Patent No.: US 9,391,809 B2
(45) Date of Patent: Jul. 12, 2016

(54) CALL ANALYSIS

(75) Inventors: James N. Russell, Tulsa, OK (US);
Joseph C. Wilson, Broken Arrow, OK
(US); Cinthya A. Rocha, Springfield,
VA (US); Bob E. Taylor, Owasso, OK
(US); Kenny M. Hawkins, Tulsa, OK
(US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 903 days.

(21) Appl. No.: 12/971,639

(22) Filed: Dec. 17, 2010

(65) Prior Publication Data

US 2012/0155455 A1 Jun. 21, 2012

(51) Int. Cl.
*H04L 12/66* (2006.01)
*H04L 29/06* (2006.01)
*H04M 7/00* (2006.01)

(52) U.S. Cl.
CPC ........... *H04L 12/66* (2013.01); *H04L 29/06027* (2013.01); *H04M 7/006* (2013.01)

(58) Field of Classification Search
CPC ... H04L 12/66; H04L 29/06027; H04M 7/006
USPC .................................................. 370/352, 356
See application file for complete search history.

(56) References Cited

U.S. PATENT DOCUMENTS

| | | | |
|---|---|---|---|
| 2002/0120765 A1* | 8/2002 | Boehmke ...................... 709/231 |
| 2004/0172265 A1* | 9/2004 | Spragle et al. .................... 705/1 |
| 2009/0129560 A1* | 5/2009 | Bowden ..................... 379/32.01 |

* cited by examiner

*Primary Examiner* — Khaled Kassim

(57) ABSTRACT

A computer having a processor and a memory is configured to obtain a first set of data from a media gateway, the first set of data including a first trunk identifier and an identifier for a point code associated with the trunk. The computer is further configured to obtain a second set of data related to the media gateway from a call database, the second set of data including a second trunk identifier, and a release code. The computer is further configured to join the first set of data to the second set of data by matching the first trunk identifier to the second trunk identifier. The computer is further configured to determine a number of times that the release code corresponds to the point code.

23 Claims, 4 Drawing Sheets

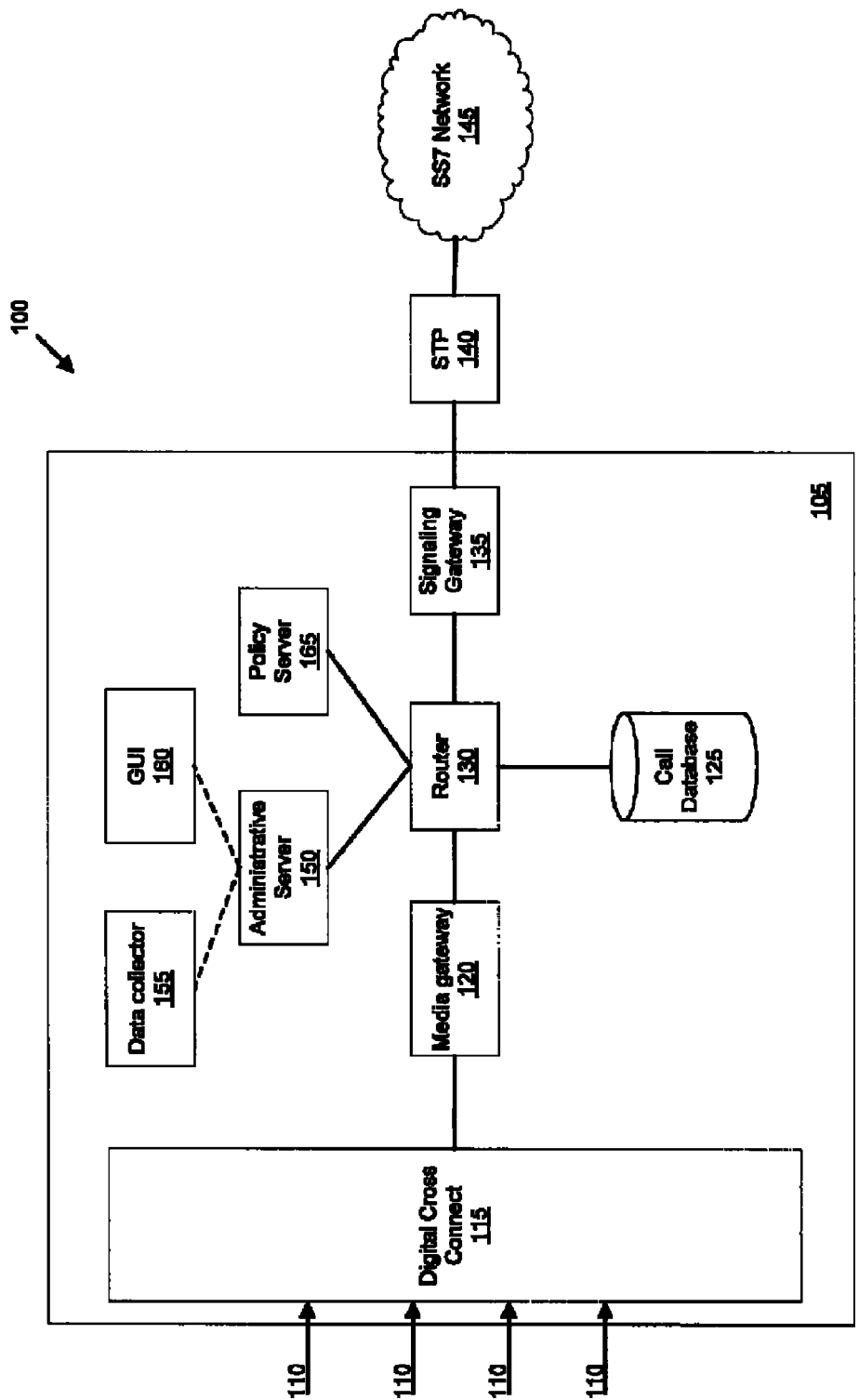

Fig. 2a

| Gateway ID 201 | Trunk ID 205 | Point Code 210 | Status Code 215 |
|---|---|---|---|

| Gateway ID 201 | Trunk ID 205 | Shelf ID 225 | Slot ID 230 | Port ID 235 | Link ID 240 | State 245 | Mode 250 | Utilization 255 |
|---|---|---|---|---|---|---|---|---|

| Gateway ID 201 | Timestamp 305 | Release code 310 | Ingress trunk ID 315 | Egress trunk ID 320 |
|---|---|---|---|---|

300

CALL ANALYSIS

BACKGROUND INFORMATION

A media gateway may be used for routing network traffic, e.g., calls. Records, e.g., call detail records, relating to a call may be stored to preserve information about the call, such as why the call was terminated. Calls handled by the media gateway may terminate for a number of reasons. For example, a called or calling party may terminate the call. However, a call may also terminate due to an error in the media gateway, insufficient bandwidth, or some other fault in a network through which the call is provided. In some cases, a call may terminate due to reasons associated with a customer, e.g., a telecommunications carrier, for a trunk over which the call is traveling. Unfortunately, mechanisms are presently lacking for correlating call detail information, such as termination data, with particular customers associated with the call.

BRIEF DESCRIPTION OF THE DRAWINGS

FIG. 1 illustrates an exemplary call processing system.

FIG. 2*a* illustrates an exemplary record pertaining to usage of a particular trunk line connected to a media gateway.

FIG. 2*b* illustrates an exemplary record pertaining to usage of a particular network link.

FIG. 3 illustrates an exemplary set of data that may be obtained from a call database.

DETAILED DESCRIPTION OF PREFERRED EMBODIMENTS

Figure 4:
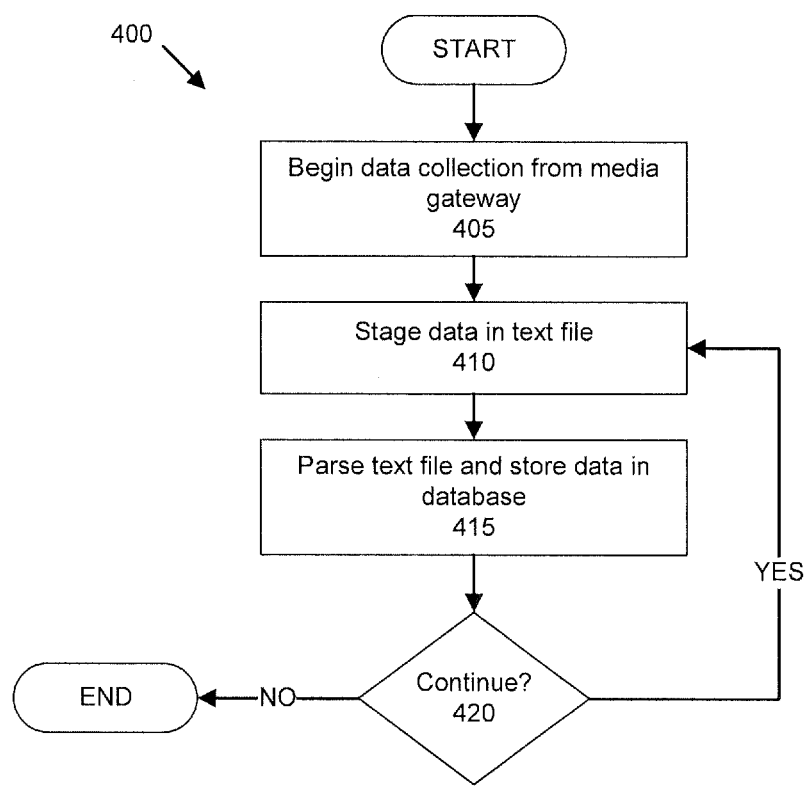
FIG. 4 illustrates an exemplary process for collecting data from a media gateway.

FIG. 1 illustrates an exemplary system 100 for processing calls that includes a call hub 105, e.g., a central office or the like for switching and routing telecommunications. Incoming calls 110 from telecommunication network carriers, e.g., from time division multiplex (TDM) networks, are received in the call hub 105 in a digital cross connect (DCC) 115. The call hub 105 includes at least one media gateway 120, and generally includes multiple media gateways 120, although only one media gateway 120 is illustrated and discussed herein for convenience. The media gateway 120 receives a TDM call 110 from DCC 115, and provides a stream of packets for the call 110 to be routed by a router 130 according to instructions provided to the media gateway 120 by a policy server 165. Records relating to calls 110 may be stored in a call database 125. A signaling gateway 135 receives signaling information for call setup from the router 130, serving as an interface between the call hub 105 and a signaling system 7 (SS7) network 145. A signal transfer point 140 sends and receives signaling information to and from the signaling gateway 135 and the network 145 for setup of calls 110.

As described herein, calls made via a media gateway 120 included in the call hub 105 may be analyzed. For example, metrics relating to congestion in a media gateway 120 may be monitored. In general, congestion in a media gateway 120 is defined as the condition that arises when the media gateway 120 is presented with traffic in excess of available bandwidth. Depending on its severity, a congestion condition can cause the quality of a data transmission, e.g., a call, to be degraded to varying degrees, or even terminated.

DCC 115 is used for providing lines that carry voice and data signals. As is known, lines are connected to ports in DCC 115, and DCC 115 allows users to digitally, rather than manually, connect lines by providing commands indicating which ingress and egress ports in DCC 115 are to be connected to one another.

Media gateway 120 generally includes what is generally referred to as a media gateway and media gateway controller. For example, in one implementation, media gateway 120 is the GSX9000 High-Density Media Gateway sold by Sonus Networks, Inc. of Westford, Mass. Media gateway 120 may receive TDM calls 110, and provide the calls 110 to router 130 according to Internet protocol (IP). Although only one media gateway 120 is shown in FIG. 1, the system 100 generally includes multiple media gateways 120.

Database 125 is generally a relational database or the like for receiving and storing records related to calls 110. The database 125 generally includes instructions stored on a computer readable medium and executable by a computer processor for storing, processing, and providing records, e.g., in response to queries.

Router 130 provides internal and external routing functionality in a packet network. For example, in one implementation, the router 130 performs operations for both Open System Interconnect (OSI) Layers 2 and 3, thus operating as both an Ethernet switch and a network router. Although only one router 130 is shown in FIG. 1, the system 100 generally includes multiple routers 130.

The signaling gateway 135 allows the media gateway 120 to interface with the SS7 network 145. For example, in one implementation, signaling gateway 135 is the SGX4000 Universal Signaling Gateway sold by Sonus Networks, Inc. Signaling gateway 135 provides interfaces for signaling according to protocols associated with the SS7 network 145, including Integrated Services Digital Network User Part (ISUP) and Transactional Capabilities Application Part (TCAP). Thus, signaling gateway 135 terminates links from SS7 network 145, and converts ISUP messages to IP messages and accordingly provides IP links in the direction of router 130.

Signal transfer point (STP) 140 is a conventional signal transfer point for use in an SS7 network. Thus, STP 140 includes a packet switch for transferring messages between call hub 105, and nodes in the SS7 network 145.

Administrative server 150 may include instructions stored on computer readable media of one or more computing devices, and may be used for various operations in call hub 105. For example, the administrative server 150 may include a data collector 155, i.e., script, software application, etc., for gathering and analyzing information from media gateway 120, as discussed further below. Further, administrative server 150 may be configured to provide a graphical user interface (GUI) 160, such as a webpage or the like. Administrative server 150 may also, e.g., the a GUI 160 or some other interface, provide a mechanism for a user to query media gateway 120, and receive data from media gateway 120 concerning call transfer operations.

Policy server 165 provides policy and routing services for media gateway 120. For example, the policy server 165 includes a database of signaling addresses for routing calls 110, and may receive signaling information from the media gateway 120, and provide instructions to the media gateway 120 on how to establish a call 110.

FIG. 2*a* illustrates an exemplary record 200 pertaining to usage of a particular trunk line connected to media gateway 120. In particular, the record 200 associates the particular trunk line with a particular point code. Media gateway ID 201 is an identifier for a media gateway 120 from which the record 200 was obtained. Media gateway ID 201 is utilized in the illustration because call hub 105 generally includes multiple media gateways 120. Trunk ID 205 is an identifier for a trunk line connected to the media gateway 120. Point code 210 is a conventional point code as used in SS7 networks, and is used to identify a particular node or element, e.g., in SS7 network 145. As such, point code 210 may be used to identify a particular destination, e.g., a customer, associated with the trunk ID 205 included in the record 200 along with the point code 210. Status code 215 provides a status of the trunk identified by trunk ID 205, e.g., "available" or "out of service."

Some or all of the foregoing elements of the data set 200 may be obtained from media gateway 120 and stored in database 125. For example, in one implementation, data collector 155 collects the data set 200 from media gateway 120 on a periodic basis. Data collector 155 may store the data set 200 in database 125, and may further evaluate elements of the data set 200, e.g., in combination with data set 220, as discussed further below. Fields 201, 205, 210, and 215 may all be stored on a computer readable medium included in media gateway 120, although media gateway ID 201 may be generated according to a media gateway 120 that was queried to obtain the record 200. Further, it is generally possible to query the media gateway 120 to obtain the record 200, possibly also along with other data.

FIG. 2b illustrates an exemplary record 220 pertaining to a usage of particular network link, e.g., a particular Trunk Level 1 (T-1) link. In particular, the record 220 associates a T-1 link with a particular trunk. Shelf ID 225, slot ID 230, and port ID 235 all identify particular locations in the media gateway 120. Shelf ID 225 identifies a particular shelf in the media gateway, slot ID 230 identifies a slot in the identified shelf, and port ID 235 identifies a particular port. Link ID 240 identifies a particular network link in the trunk identified by trunk ID 205. State 245 is an indicator of whether the identified link is available to be used, e.g., is enabled. Mode 250 is an indicator of whether the identified link is in service. State 245 and mode 250 provide information that may be used to alleviate network congestion, e.g., if a link is in service but not enabled, the link might be able to be used to relieve network congestion. Similarly, if a link is not in service but could be enabled, the link likewise might be able to be used to relieve network congestion. Utilization 255 provides a utilization for the link identified by the link ID 240, e.g., in terms of a percentage of capacity of the link being used.

Some or all of the foregoing elements of the data set 220 may be obtained from media gateway 120 and stored in database 125. For example, in one implementation, data collector 155 collects the data set 220 from media gateway 120 on a periodic basis. Data collector 155 may store the data set 220 in database 125, and may further evaluate elements of the data set 200, e.g., in combination with data set 200, as discussed further below. Fields 201, 205, 225, 230, 235, 240, 245, 250, 255, etc. may all be stored on a computer readable medium included in media gateway 120, although media gateway ID 201 may be generated according to a media gateway 120 that was queried to obtain the record 200. Further, it is generally possible to query the media gateway 120 to obtain the record 220, possibly also along with other data.

FIG. 3 illustrates an exemplary set of data 300 that may be obtained from the call database 125. Data 300 may be stored in the call database 125 from media gateway 120, e.g., for billing purposes. In the illustrated implementation, the data 300 includes a subset of elements found in what is sometimes referred to as a Call Detail Record (CDR); a CDR generally includes numerous elements in addition to those discussed with respect to data 300.

The data set 300 includes a media gateway ID 201 identifying a media gateway 120 used for the call.

Further, the data set 300 includes a timestamp 305, generally representing a date and time that a call was processed in the media gateway 120.

Release code 310 identifies a reason why a call was terminated. For example, release code 230 may be an integer from 1 to 161, with each number in that range corresponding to a reason why a call was terminated. For example, one number may indicate that a call was terminated for normal reasons, e.g., because a called or calling party terminated the call. However, a call could also be dropped, lost, or otherwise terminated for a variety of reasons. In general, examples of release causes to which release codes 310 may correspond include a "normal clearing" condition, a lack of a route for a call, a call being preempted, a called number being busy, a called number not answering, a call being rejected, a number being changed, etc.

Ingress trunk ID 320 is an identifier for a trunk line connected to the media gateway 120 that provides a point of ingress for the call associated with the data set 220.

Egress trunk ID 325 is an identifier for a trunk line connected to the media gateway 120 that provides a point of egress for the call associated with the data set 220.

FIG. 4 illustrates an exemplary process 400 for collecting data from media gateway 120. For example, process 300 may be carried out according to instructions included in data collector 155. The process 400 begins in a step 405, when the data collector 155 initiates data collection. For example, the data collector 155 may include a script or the like that includes a query or queries to the media gateway 120 to obtain the data described with respect to records 200 and/or 220. In some implementations, the query may be configured to initiate a stream of data provided in response to the query. In other implementations, the query or queries may be provided to and responded to by media gateway 120 on a periodic basis.

Next, in step 410, data collector 155 receives the requested data, and stages it, e.g., in a text file or so-called flat file.

Next, in step 415, data collector 155 parses the data staged in step 410 and stores the parsed data in a data store, e.g., a computer readable medium accessible by or included in administrative server 150, database 125, or some other data store. Parsing the data staged in step 410 includes identifying different fields 205, 210, 215.

Next, in step 420, data collector 155 determines whether data collections should continue. For example, data collector 155 may be configured to only collect data for a predetermined period of time, may have received input constructing it to seize data collections, etc. If data collection should continue, process 400 returns to step 410 to receive data from media gateway 120. Otherwise, process 400 ends.

Figure 5:
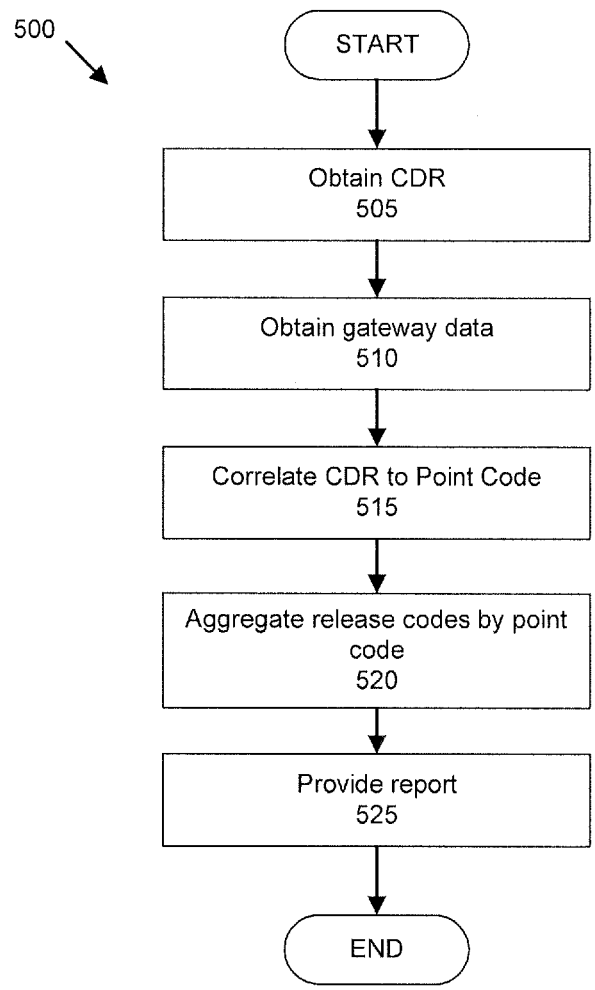
FIG. 5 illustrates an exemplary process for correlating and aggregating call detail information such as call termination data according to customer-associated data such as point codes.

FIG. 5 illustrates an exemplary process 500 for correlating and aggregating call detail information such as call termination data according to customer-associated data such as point codes. Process 500 begins in a step 505, in which data collector 155 obtains a data set 300, e.g., a set of call detail records, from database 125.

Next, in step 510, data collector 155 obtains data relating to a media gateway 120, e.g., records 200 and/or 220, generally stored in database 125 as described above with respect to FIG. 4.

Next, in step 515, data collector 155 associates each of the records 300 with a point code 210. For example, records 300 and 200 may be linked by joining the records 300 and 200 on egress trunk ID 320 and trunk ID 205. That is, where the egress trunk ID 320 in a record 300 matches the trunk ID 205 in a record 200, then the point code 210 in the record 200 may be associated with the record 300.

Next, in step 520, data collector 155 aggregates release codes 310 associated with point codes 210. For example, data collector 155 could determine, for each distinct point code 210 in the data 200, distinct release codes 310 associated with the point code 210, as well as a number of times each release code 310 has occurred. Using timestamp 305, or simply by restricting a query to data 300 collected within a certain time period, data collector 155 may determine incidences of respective release codes 310 within a certain span of time, as a trend over a certain span of time, etc. Also, data collector 155 may perform analyses of release codes 310 with respect to predetermined time periods, e.g., data collector 155 could show incidences of one or more release codes 310 for a point code 210 for a series of days, weeks, months, etc.

Other aggregations are possible, and data collector 155 may perform a variety of analyses using the data sets 200, 220 and 300. For example, one possible analysis would be to determine a number of calls associated with a point code 210 that were not associated with a "normal clearing" or the like release code 310. In other words, call failure rates for a point code 210 could be obtained by aggregating all release codes 310 that are not associated with normal clearing. Likewise, call failure rates associated with ingress trunk IDs 315, egress trunk IDs 320, etc. could be determined. Further, other data from a call detail record could be included in data 300. For example, call failure rates or other information associated with various release codes 310 could be determined for addresses, e.g., network addresses such as Internet protocol (IP) addresses associated with a call source or destination, whether various protocols were used for the call, e.g., Voice over Internet protocol (VoIP), etc.

In addition, data collector 155 could use records 200 and 220 to aggregate release codes 310 or other data in a record 300 according to a point code 210 and various data in record 220 pertaining to a media gateway 120, e.g., an analysis could be provided of failures for a point code 210, or set of point codes 210, grouped according to a shelf ID 225, slot ID 230, port ID 235, and/or link IDs 240, etc. Collectively or individually, shelf ID 225, slot ID 230, port ID 235, and link ID 240 are each sometimes referred to a location data for a media gateway 120 because they identify physical locations, e.g., shelves, slots, ports, etc., in the media gateway 120.

Following step 520, in step 525, data collector 155 provides a report of the analysis conducted as described with respect to step 520. For example, a report may be provided through GUI 160, by sending an e-mail, text message, or other message to an administrator, or via some other mechanism.

Following step 525, the process 500 ends.

Computing devices such as those disclosed herein may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of

What is claimed is:

1. A method, comprising:
    obtaining a set of first records from a media gateway, each first record including a first trunk identifier identifying a trunk and an identifier for a point code associated with the trunk, wherein the set of first records includes a state indicator identifying an availability of a link and a mode indicator identifying a service status of a link;
    obtaining a set of second records related to the media gateway from a call database, each second record including a second trunk identifier identifying the trunk and a release code;
    matching, in a computer having a processor and a memory, the first trunk identifier of each first record from the media gateway to a corresponding second trunk identifier of each second record from the call database to aggregate release codes from the set of second records according to each identifier for the point code; and
    determining a failure rate for a physical link location in the media gateway based on a number of times that each release code corresponds to each identifier for the point code, thereby providing a failure analysis for each link within the media gateway based on the link indicator, utilization indicator, state indicator, mode indicator, and the number of times each release code corresponds to the link.

2. The method of claim 1, wherein each first record further includes a first media gateway identifier and each second record further includes a second media gateway identifier, and further wherein the aggregating of the release codes from the set of second records according to each identifier for the point code is further based on matching the first media gateway identifier to a corresponding second media gateway identifier.

3. The method of claim 1, the second trunk identifier identifying the trunk as an egress trunk from the media gateway.

4. The method of claim 1, wherein each second record further includes a timestamp, and further wherein determining the number of times that each release code corresponds to each identifier for the point code further includes determining a number of times that each release code corresponds to each identifier for the point code and a plurality of time periods.

5. The method of claim 1, wherein the physical link location identifies at least one of a shelf, slot, and port in the media gateway to which a failure pertains.

6. The method of claim 5, wherein determining the number of times that each release code corresponds to each identifier for the point code further includes determining a number of times that each release code corresponds to each identifier for the point code for the physical link location in the media gateway.

7. The method of claim 1, wherein obtaining the set of first records from the media gateway further comprises:
    initiating, by the computer, the media gateway to send a record to the computer via a query; and
    parsing a record for fields respective the first trunk identifier and the identifier for the point code associated with the trunk to generate the set of first records.

8. The method of claim 7, wherein parsing the record further comprises:
    staging the record in a flat file suitable for parsing by the computer; and
    parsing the flat file for the fields to generate the set of first records.

9. The method of claim 1, the set of first records including:
    a link indicator identifying a link of the media gateway that is connecting the trunk identified by the first trunk identifier to the media gateway; and
    a utilization indicator provides a utilization for the link.

10. The method of claim 9, wherein determining the number of times that each release code corresponds to each identifier for the point code further comprises:
    providing a failure analysis for each link within the media gateway based on the link indicator, the utilization indicator, and the number of times each release code corresponds to the link.

11. The method of claim 1, each release code being one of a set of integers, each integer corresponding to a different call termination result.

12. A system, comprising:
    a computer having a processor and a memory, the computer configured to:
    obtain a set of first records from a media gateway, each first record including a first trunk identifier configured to identify a trunk and an identifier for a point code associated with the trunk, wherein the set of first records includes a state indicator identifying an availability of a link and a mode indicator identifying a service status of a link;
    obtain a set of second records related to the media gateway from a call database, each second record including a second trunk identifier configured to identify the trunk, and a release code;
    match the first trunk identifier of each first record from the media gateway to a corresponding second trunk identifier of each second record from the call database to aggregate release codes from the set of second records according to each identifier for the point code; and
    determine a failure rate for a physical link location in the media gateway based on a number of times that each release code corresponds to each identifier for the point code, thereby providing a failure analysis for each link within the media gateway based on the link indicator, utilization indicator, state indicator, mode indicator, and the number of times each release code corresponds to the link.

13. The system of claim 12, wherein each first record further includes a first media gateway identifier and each second record further includes a second media gateway identifier, and further wherein the aggregation of the release codes of the set of second records according to each identifier for the point code is further based on matching the first media gateway identifier to a corresponding second media gateway identifier.

14. The system of claim 12, the second trunk identifier is configured to identify the trunk as an egress trunk from the media gateway.

15. The system of claim 12, wherein each second record further includes a timestamp, and further wherein the computer is configured to determine the number of times that each release code corresponds to each identifier for the point code at least in part by determining a number of times that each release code corresponds to each identifier for the point code and a plurality of time periods.

16. The system of claim 12, wherein the physical link location identifies at least one of a shelf, slot, and port in the media gateway to which a failure pertains.

17. The system of claim 16, wherein the computer is configured to determine the number of times that each release code corresponds to each identifier for the point code at least in part by determining a number of times that each release code corresponds to each identifier for the point code for the physical link location in the media gateway.

18. A non-transitory computer-readable medium tangibly embodying computer-executable instructions for causing a processor to perform operations comprising to
- obtaining a set of first records from a media gateway, each first record including a first trunk identifier identifying a trunk and an identifier for a point code associated with the trunk, wherein the set of first records includes a state indicator identifying an availability of a link and a mode indicator identifying a service status of a link;
- obtaining a set of second records related to the media gateway from a call database, each second record including a second trunk identifier identifying the trunk and a release code;
- matching the first trunk identifier of each first record from the media gateway to a corresponding second trunk identifier of each second record from the call database to aggregate release codes from the set of second records according to each identifier for the point code; and
- determining a failure rate for a physical link location in the media gateway based on a number of times that each release code corresponds to each identifier for the point code, thereby providing a failure analysis for each link within the media gateway based on the link indicator, utilization indicator, state indicator, mode indicator, and the number of times each release code corresponds to the link.

19. The medium of claim 18, wherein each first record further includes a first media gateway identifier and each second record further includes a second media gateway identifier, and further wherein the aggregating of the release codes of the set of second records according to each identifier for the point code is further based on matching the first media gateway identifier to a corresponding second media gateway identifier.

20. The medium of claim 18, the second trunk identifier identifying the trunk as an egress trunk from the media gateway.

21. The medium of claim 18, wherein each second record further includes a timestamp, and further wherein determining the number of times that each release code corresponds to each identifier for the point code further includes determining a number of times that each release code corresponds to each identifier for the point code and a plurality of time periods.

22. The medium of claim 18, wherein the physical link location identifies at least one of a shelf, slot, and port in the media gateway to which a failure pertains.

23. The medium of claim 22, wherein determining the number of times that each release code corresponds to each identifier for the point code further includes determining a number of times that each release code corresponds to each identifier for the point code for the physical link location in the media gateway.

* * * * *